United States Patent

Udagawa

[11] Patent Number: 5,769,430
[45] Date of Patent: Jun. 23, 1998

[54] METAL GASKET WITH BEAD AND THERMAL SPRAYED LAYER THEREOF

[75] Inventor: Tsunekazu Udagawa, Ichikawa, Japan

[73] Assignee: Ishikawa Gasket Co., Ltd., Tokyo, Japan

[21] Appl. No.: 723,543

[22] Filed: Sep. 30, 1996

[51] Int. Cl.$^6$ ..................................................... F16J 15/08
[52] U.S. Cl. ........................................... 277/592; 277/593
[58] Field of Search ........................... 277/235 A, 235 B, 277/180, 236

[56] References Cited

U.S. PATENT DOCUMENTS

| | | | |
|---|---|---|---|
| 3,163,431 | 12/1964 | Tanner | 277/180 |
| 4,397,472 | 8/1983 | Czernik | 277/235 B |
| 4,807,892 | 2/1989 | Udagawa | 277/235 B |
| 4,810,591 | 3/1989 | Sakai | 428/652 |
| 4,898,396 | 2/1990 | Udagawa | 277/235 B |
| 5,150,910 | 9/1992 | Udagawa | 277/235 B |
| 5,205,566 | 4/1993 | Ueta et al. | 277/180 |
| 5,280,928 | 1/1994 | Ueta et al. | 277/235 B |
| 5,427,388 | 6/1995 | Ueta | 277/235 B |

*Primary Examiner*—Diego F.F. Gutierrez
*Assistant Examiner*—John L. Beres
*Attorney, Agent, or Firm*—Kanesaka & Takeuchi

[57] ABSTRACT

A metal gasket for an internal combustion engine is formed of at least one metal plate for constituting the metal gasket. The metal plate includes a hole and a bead formed around the holes for sealing the same. A thermal sprayed layer is formed integrally on and/or under the bead to locally increase the surface pressure of the bead when the bead is compressed. Thus, the surface pressure of the bead can be adjusted individually as desired.

9 Claims, 1 Drawing Sheet

5,769,430

METAL GASKET WITH BEAD AND THERMAL SPRAYED LAYER THEREOF

BACKGROUND OF THE INVENTION AND RELATED ART STATEMENT

The present invention relates to a metal gasket with a bead and a thermal sprayed layer thereof. In particular, a thermal sprayed layer is formed on or under the bead to locally increase a surface pressure or spring constant of the bead.

In a metal gasket or a metal laminate gasket, a bead is often formed on a metal plate around a hole to be sealed. When the gasket is installed between engine parts and is tightened therebetween, the bead around the hole is compressed to provide surface pressure around the hole to thereby securely seal around the hole.

In order to control the surface pressure of the bead when the bead is compressed, it has been known that the width and height of the bead may be changed. Generally speaking, as the width of the bead increases, the surface pressure obtained from the bead decreases. Also, as the height of the bead decreases, the surface pressure of the bead decreases.

Further, thickness and hardness of a plate where a bead is formed are important factors, as well. Generally, as the hardness or the thickness decreases, the surface pressure of the bead decreases.

In case a gasket for an engine is designed, a temperature and pressure of cylinder bores and the arrangement of the cylinder bores and water holes are important factors. Also, it is preferable to form a gasket as thin as possible to decrease an entire weight of the engine. Therefore, the hardness and the thickness of a plate and a number of plates to be used for a gasket are generally limited. In a limited quality and number of the plates, there may be a situation that a surface pressure of a bead is desired to be locally increased to securely seal around all the holes.

As explained above, if the width or height of a bead is changed, it is possible to regulate the surface pressure of the bead. However, it is difficult to precisely adjust the width and height. Especially, in case surface pressure in some of the beads is desired to be slightly increased, it is not practical to change the width or height of the bead.

In a metal laminate gasket, if a surface pressure regulation plate is arranged near a bead, the thickness of the surface pressure regulation plate may be changed to regulate the surface pressure of the bead. However, in case the thickness of the surface pressure regulation plate is changed, the pressure obtained through the bead is simply changed. The surface pressure formed by the bead is not changed or increased.

There has not been known to locally regulate or increase surface pressure of a bead when the bead is compressed.

An object of the invention is to provide a metal gasket wits a bead, wherein a surface pressure of the bead can be locally adjusted or increased as desired.

Another object of the invention is to provide a metal gasket as stated above, wherein characteristics of the beads can be changed based on kinds and locations of the holes, around which the beads are formed.

A further object of the invention is to provide a metal gasket as stated above, wherein the surface pressure of the bead can be easily changed.

Further objects and advantages of the invention will be apparent from the following description of the invention.

SUMMARY OF THE INVENTION

A metal gasket of the invention is used for an internal combustion engine. The gasket is formed of a metal plate for constituting the metal gasket, which includes a hole and a bead formed around the hole for sealing the same. A thermal sprayed layer is formed integrally over the bead to locally increase surface pressure of the bead when the bead is compressed.

In particular, the bead includes a projection and a dent at a side opposite to the projection. The thermal sprayed layer may be formed on and/or under the bead. Preferably, the thermal sprayed layer is formed in and around the dent of the bead without extending a substantially entire area of the metal plate.

Since the thermal sprayed layer is formed on or in the bead, the strength or elasticity of the bead is locally increased. Thus, the surface pressure of the bead when the bead is compressed is increased.

The thermal sprayed layer is formed by thermal spraying of metals, such as nickel and copper, or ceramics, on or in the bead Gas spraying or plasma spraying is used for forming the thermal sprayed layer. The thickness of the thermal sprayed layer is preferably 50–100 μm.

The metal plate for the gasket generally includes a plurality of cylinder bores and a plurality of fluid holes. The beads and thermal sprayed layers are formed around all or selected cylinder bores and the fluid holes. The thermal sprayed layer formed around the cylinder bore may contain nickel to increase spring constant of the bead, and the thermal sprayed layer formed around the fluid hole may contain copper suitable for water.

The gasket as explained above is formed of one metal plate. However, the metal plate may be combined with one or more metal plates to form a metal laminate gasket.

DETAILED DESCRIPTION OF A PREFERRED EMBODIMENT

Figure 1:
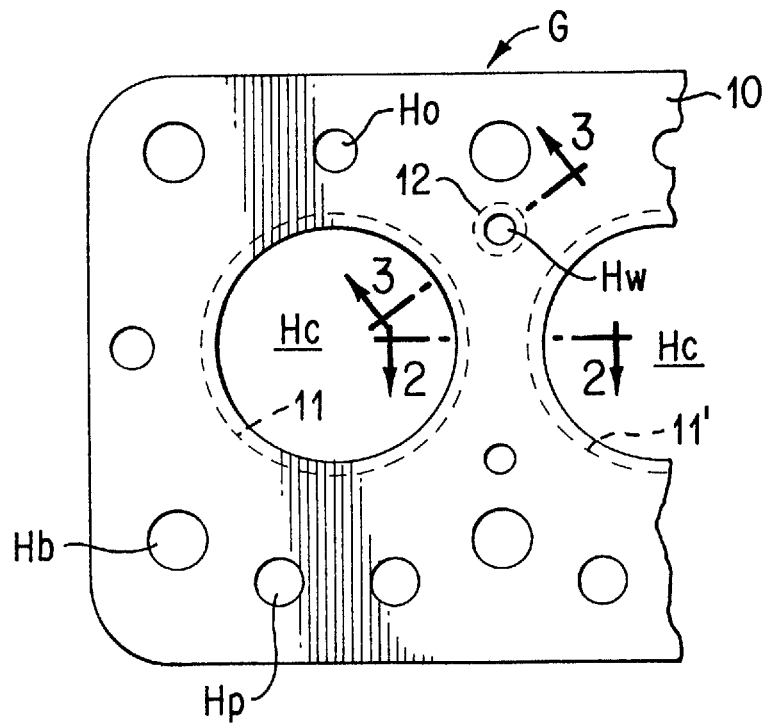
FIG. 1 is a plan view of a part of a metal gasket, used as a cylinder head gasket, of the present invention.
Figure 2:
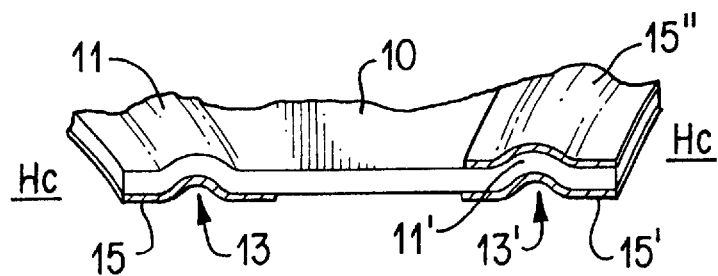
FIG. 2 is an enlarged sectional view taken along line 2—2 in FIG. 1.
Figure 3:
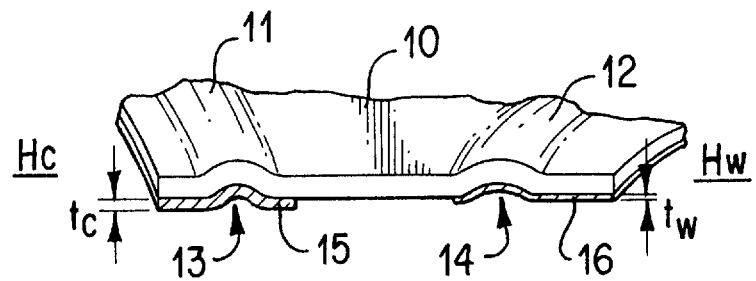
FIG. 3 is an enlarged sectional view taken along line 3—3 in FIG. 1.

A gasket G of the invention as shown in FIGS. 1–3 is a cylinder head gasket for an automobile. The gasket G includes a plurality of cylinder bores Hc, water holes Hw, oil holes Ho, push rod hole,. Hp and bolt holes Hb, as in a conventional gasket.

The gasket G is formed of one metal plate 10 extending throughout entire areas of engine parts to be sealed, and include beads 11, 11' around the cylinder bores Hc and beads 12 around the water holes Hw. Other holes, such as oil holes Ho and push rod holes Hp, may have sealing means like beads, but such sealing means is omitted in the drawings.

The beads 11, 11', 12 project upwardly from an upper side of the plate 10 to form an upwardly curved shape. Thus, dents 13, 13', 14 are formed behind the beads 11, 11', 12, i.e. at a rear side of the plate 10. The beads 11, 11', 12 provide surface pressures to seal around the cylinder bores Hc and water holes Hw when the gasket 10 is compressed.

In the invention, thermal sprayed layers 15, 15' are formed in and around the dent 13, 13' of the beads 11, 11', while a thermal sprayed layer 15" is formed on and around the bead 11'. Thermal sprayed layer 16 is formed in and around the dent 14 of the bead 12. The thermal sprayed layer 15 or 15' extends from an edge of the cylinder bore Hc to a portion slightly beyond the bead 11 or 11', while the thermal sprayed layer 15" extend from an edge of the cylinder bore to a portion slightly beyond the bead 11'. Similarly, the thermal sprayed layer 16 extends from an edge of the water hole Hw to a portion slightly beyond the bead 12. The thermal sprayed layers 15, 15', 15", 16 have annular shapes and are not formed or entire lower or upper surface of the plate 10.

Since the thermal sprayed layers 15, 15', 15", 16 extend from the edges of the cylinder bores Hc and water holes Hw, the thickness of the plate 10 is slightly increased at the edges of the cylinder bores Hc and water holes Hw. Thus, when the gasket G or plate 10 is compressed, the edges of the cylinder bores Hc and water hole Hw provide surface pressures slightly greater than the rest of the areas of the gasket. The increased surface pressures help sealing around the cylinder bores Hc and water holes Hw.

The thermal sprayed layers 15, 15', 15", 16 are formed by gas or plasma spraying, as known already in the art. Metals, such as nickel or copper, or ceramics are used to form the thermal sprayed layers 15, 15', 15", 16. Preferably, the thermal sprayed layers 15, 15', 15" contain nickel to increase spring or elastic ability of the bead 11, and the thermal sprayed layer 16 contains copper suitable for sealing around the water hole Hw. The thickness of the thermal sprayed layers 15, 15', 15", 16 is 50–100 gm.

Preferably, the thickness tc of the thermal sprayed layers 15, 15' is made thicker than the thickness tw of the thermal sprayed layer 16. Since the thickness tc of the thermal sprayed layers 15, 15' is thicker than the thickness tw of the thermal sprayed layer 16, the areas at the thermal sprayed layers 15, 15' can provide surface pressures higher than that at the thermal sprayed layer 16 to securely seal around the cylinder bores Hc and water holes Hw.

In the gasket G, the thermal sprayed layers 15, 15', 16 are formed in the dents 13, 14 and their vicinities. In this respect, if the thermal sprayed layers 15, 15', 16 are formed on the beads 11, 12, the thermal sprayed layers 15, 15', 16 may wear when the gasket is used for a long time. Since the thermal sprayed layers 15, 15', 16 are formed in the dents 13, 14, the thermal sprayed layers 15, 15', 16 do not substantially wear. Therefore, wearing of the thermal sprayed layers 15, 15', 16 and decreasing of the surface pressures of the beads 11, 12 need not be considered.

However, in case a high surface pressure is required, a thermal sprayed layer may be formed on the bead, as in the thermal sprayed layer 15". Preferably, the thermal sprayed layer 15" is formed at a portion where wearing of the layer 15" does not occur.

The gasket G is formed of one metal plate 10. However, the metal plate 10 may be combined with one or more metal plates to constitute a metal laminate gasket. The other metal plate may have the thermal sprayed layers.

In the gasket G of the invention, the thermal sprayed layers are formed around the cylinder bores Hc and water holes Hw. However, other holes may have the thermal sprayed layers. Also, only some of the beads around the cylinder bores Hc and water holes Hw may have the thermal sprayed layers, or all of the beads around the cylinder bores Hc and water holes Hw may have the thermal sprayed layers on one side or both sides.

In the present invention, since the thermal sprayed layers are formed on or under the beads, the characteristics of the beads are changed. It is possible to locally increase the spring constant or ability of the bead. Thus, the gasket can securely and properly seal around all the holes of the engine.

While the invention has been explained with reference to the specific embodiment of the invention, the explanation is illustrative and the invention is limited only by the appended claims.

What is claimed is:

1. A metal gasket for an internal combustion engine, comprising,
   a metal plate for constituting the metal gasket, said metal plate having a hole and a bead formed around the hole for sealing the same, and
   a thermal sprayed layer formed integrally on at least one side of the bead, said thermal sprayed layer directly contacting and covering the bead without extending a substantially entire area of the metal plate to increase surface pressure of the bead when the bead is compressed.

2. A metal gasket according to claim 1, wherein said bead includes a projection and a dent at a side opposite to the projection, said thermal sprayed layer being formed in and around the dent of the bead.

3. A metal gasket according to claim 2, wherein said metal plate includes a plurality of cylinder bores and a plurality of fluid holes, said bead and thermal sprayed layer being formed around each of the cylinder bores and the fluid holes.

4. A metal gasket according to claim 3, wherein said thermal sprayed layer includes a first layer formed around the cylinder bore, an a second layer formed around the fluid hole, said first layer containing Ni to increase spring force of the bead and said second layer containing Cu.

5. A metal gasket according to claim 4, wherein the thickness of the first layer is formed greater than the thickness of the second layer.

6. A metal gasket according to claim 1, wherein said thermal sprayed layer is formed on and around the bead.

7. A metal gasket for an internal combustion engine, comprising,
   a metal plate for constituting the metal gasket, said metal plate having a plain outer surface, a hole and a bead formed around the hole for sealing the same, said bead having a curved portion extending upwardly from the plain outer surface of the metal plate to have a curved outer surface and a curved inner surface, said curved inner surface forming a dent around the hole, and
   at least one thermal sprayed layer formed on at least one of the curved outer surface and the curved inner surface of the bead, said thermal sprayed layer directly contacting and covering an entire area of the at least one of the curved outer surface and the curved inner surface of the bead without extending a substantially entire area of the metal plate to increase surface pressure of the bead when the bead is compressed.

8. A metal gasket according to claim 7, wherein said at least one thermal sprayed layer is formed on each of the curved outer surface and the curved inner surface, said thermal sprayed layers formed on the curved outer surface and the curved inner surface being aligned and vertically spaced apart from each other with the bead therebetween.

9. A metal gasket according to claim 7, wherein said bead has a semicircular shape.

* * * * *

UNITED STATES PATENT AND TRADEMARK OFFICE
CERTIFICATE OF CORRECTION

PATENT NO.   : 5,769,430
DATED        : June 23, 1998
INVENTOR(S)  : Tsunekazu Udagawa It is certified that error appears in the above-indentified patent and that said Letters Patent is hereby corrected as shown below:

In the cover page, Section 57 ABSTRACT, line 4, change "holes" to --hole--;

In column 1, line 53, change "wits" to --with--;

In column 2, line 18, after "bead" put period;

In column 3, line 3, change "extend" to --extends--,
                      line 8, change "or" (first occurrence) to --on--, line 26, change "gm" to -- $\mu$m--; and In column 4, line 30, change "an" to --and--.

Signed and Sealed this

Twenty-second Day of September, 1998

*Attest:*

BRUCE LEHMAN

*Attesting Officer*      *Commissioner of Patents and Trademarks*